(12) United States Patent
Nishi

(10) Patent No.: US 10,235,881 B2
(45) Date of Patent: Mar. 19, 2019

(54) AUTONOMOUS OPERATION CAPABILITY CONFIGURATION FOR A VEHICLE

(71) Applicant: Toyota Motor Engineering & Manufacturing North America, Inc., Erlanger, KY (US)

(72) Inventor: Tomoki Nishi, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 15/663,245

(22) Filed: Jul. 28, 2017

(65) Prior Publication Data

US 2019/0035275 A1    Jan. 31, 2019

(51) Int. Cl.
    *G08G 1/16*    (2006.01)
    *G05D 1/02*    (2006.01)
    *G01S 5/00*    (2006.01)

(52) U.S. Cl.
    CPC .............. *G08G 1/16* (2013.01); *G01S 5/0072* (2013.01); *G05D 1/0291* (2013.01); *G08G 1/161* (2013.01); *G08G 1/167* (2013.01); *G05D 2201/0213* (2013.01)

(58) Field of Classification Search
    USPC ........................................................ 701/301
    See application file for complete search history.

(56) References Cited

U.S. PATENT DOCUMENTS

| | | | | |
|---|---|---|---|---|
| 8,781,669 B1* | 7/2014 | Teller | ...................... | G05D 1/021 700/245 |
| 9,031,732 B1* | 5/2015 | Cudak | ...................... | G01C 21/26 701/23 |
| 9,511,767 B1 | 12/2016 | Okumura | | |
| 9,682,704 B2* | 6/2017 | Teller | ...................... | B60W 30/08 |
| 9,684,836 B1* | 6/2017 | Ferguson | ........... | G06K 9/00798 |
| 2008/0269985 A1 | 10/2008 | Yamada | | |
| 2016/0082953 A1* | 3/2016 | Teller | ................... | G05D 1/0088 701/23 |
| 2017/0158191 A1* | 6/2017 | Bills | ................... | B60W 30/025 |

(Continued)

OTHER PUBLICATIONS

Emanuel Todorov. Eigenfunction approximation methods for linearly-solvable optimal control problems. In Adaptive Dynamic Programming and Reinforcement Learning, 2009. ADPRL'09. IEEE Symposium on, pp. 161-168. IEEE, 2009.

(Continued)

*Primary Examiner* — Tyler D Paige
(74) *Attorney, Agent, or Firm* — Christopher G. Darrow; Darrow Mustafa PC

(57) ABSTRACT

A method and device for configuring an autonomous operation capability of a vehicle are disclosed. A first dataset is identified relating to a plurality of vehicles, wherein the vehicle is one of the plurality of vehicles. A state value function is produced for the autonomous vehicle capability in relation to the first dataset. A second dataset is identified relating to a portion of the plurality of vehicles, wherein the portion of the plurality of vehicles includes the vehicle. A policy control gain is optimized for the autonomous vehicle capability in relation to the second dataset. The autonomous vehicle capability is operable to generate an autonomous vehicle action for progressing to a next state based on the state value function in cooperation with the policy control gain.

16 Claims, 6 Drawing Sheets

(56) References Cited

U.S. PATENT DOCUMENTS

| | | | |
|---|---|---|---|
| 2017/0160745 A1* | 6/2017 | Lauffer | G01S 13/931 |
| 2017/0228604 A1* | 8/2017 | Ferguson | G06K 9/00798 |
| 2017/0242442 A1* | 8/2017 | Minster | G05D 1/0253 |
| 2017/0297586 A1* | 10/2017 | Li | G05D 1/0088 |
| 2017/0305434 A1* | 10/2017 | Ratnasingam | B60W 40/09 |
| 2017/0334450 A1* | 11/2017 | Shiraishi | B60W 50/08 |
| 2017/0337816 A1* | 11/2017 | Lu | G08G 1/0962 |
| 2018/0032082 A1* | 2/2018 | Shalev-Shwartz | G05D 1/0221 |
| 2018/0074493 A1* | 3/2018 | Prokhorov | G05D 1/0088 |
| 2018/0087912 A1* | 3/2018 | Nguyen | G06F 17/30241 |
| 2018/0089227 A1* | 3/2018 | Reddy | G06F 17/30241 |
| 2018/0101172 A1* | 4/2018 | Min | G05D 1/0088 |

OTHER PUBLICATIONS

Christopher Jch Watkins and Peter Dayan. Q-learning. Machine learning, 8(3-4):279-292, 1992.

Michael Fairbank. Value-gradient learning. PhD thesis, City University London, 2014.

Balkenius, C. and Winberg, S. (2008). Fast Learning in an Actor-Critic Architecture with Reward and Punishment, In A. Holst, P. Kreuger and P. Funk (Eds) Tenth Scandinavian Conference on Artificial Intelligence (SCAI 2008) (pp. 20-27).

Lei, Huitian, "An Online Actor Critic Algorithm and a Statistical Decision Procedure for Personalizing Intervention" Dissertation 2016, University of Michigan.

Eiji Uchibe and Kenji Doya. Combining learned controllers to achieve new goals based on linearly solvable mdps. In Robotics and Automation (ICRA), 2014 IEEE International Conference on, pp. 5252-5259. IEEE, 2014.

* cited by examiner memory 206 vehicle environment 116

AUTONOMOUS OPERATION CAPABILITY CONFIGURATION FOR A VEHICLE

FIELD

The subject matter described herein relates in general to autonomous vehicle operation in a vehicle environment device and, more particularly, to establishing autonomous vehicle capability for a vehicle based on passive environmental data.

BACKGROUND

In general, autonomous vehicles have used control system architectures to perform autonomous driving functions to travel a trajectory plan having an origin and a destination. For autonomous operation, active environment scanning has been required to assess conditions local to a vehicle, and to then produce an action to progress towards an autonomous objective (such as increasing speed, coming to a stop at a stop light, etc.). Also, because of the variety of vehicles (such as sports vehicles, suburban utility vehicles, outdoor vehicles, pickup trucks, etc.), the high sampling and scanning rates for assessing these environments generate large raw data volumes to process and make sense of within a limited time, which generally overburdens the sensor devices and processing devices, frustrating the ability to make effective and timely autonomous decisions. A need exists for a method and device that can optimize autonomous vehicle decision-making in a vehicle environment so as to form timely action decisions (such as whether to accelerate, decelerate, etc.) while also taking into account the varying and largely diverging operational models of the variety of non-similar (or heterogeneous) autonomous-capable vehicles.

SUMMARY

A device and method for configuring an autonomous operation capability, of a vehicle are disclosed. The resulting autonomous vehicle operation may provide for an autonomous vehicle objective based on a first dataset relating to a plurality of vehicles, and a second dataset relating to a portion of the plurality of vehicles.

In one implementation, a method for configuring an autonomous operation capability of a vehicle is disclosed. A first dataset is identified relating to a plurality of vehicles, wherein the vehicle is one of the plurality of vehicles. A state value function is produced for the autonomous vehicle capability in relation to the first dataset. A second dataset is identified relating to a portion of the plurality of vehicles, wherein the portion of the plurality of vehicles includes the vehicle. A policy control gain is optimized for the autonomous vehicle capability in relation to the second dataset. The autonomous vehicle capability is operable to generate an autonomous vehicle action for progressing to a next state based on the state value function in cooperation with the policy control gain.

In another implementation, a vehicle control unit is configured for an autonomous vehicle capability for a vehicle is disclosed. The vehicle control unit includes a wireless communication interface, a processor, and memory. The wireless communication interface is operable to service communications with a vehicle network. The processor is communicably coupled to the wireless communication interface, and to a plurality of vehicle sensor devices. The memory is communicably coupled to the processor and stores a reinforcement learning module. The reinforcement learning module includes instructions that, when executed by the processor, cause the processor to configure the reinforcement learning module by accessing a passive environmental dynamic dataset relating to a plurality of vehicles, wherein the vehicle is one of the plurality of vehicles. The reinforcement learning module produces a state value function for the autonomous vehicle capability in relation to the passive environmental dynamic dataset. The reinforcement learning module identifies a control dynamics model relating to a portion of the plurality of vehicles, wherein the portion of the plurality of vehicles includes the vehicle, and optimizes a policy control gain for the autonomous vehicle capability in relation to the second dataset.

BRIEF DESCRIPTION OF THE DRAWINGS

The description makes reference to the accompanying drawings wherein like reference numerals refer to like parts throughout the several views, and wherein.

DETAILED DESCRIPTION

Figure 1:
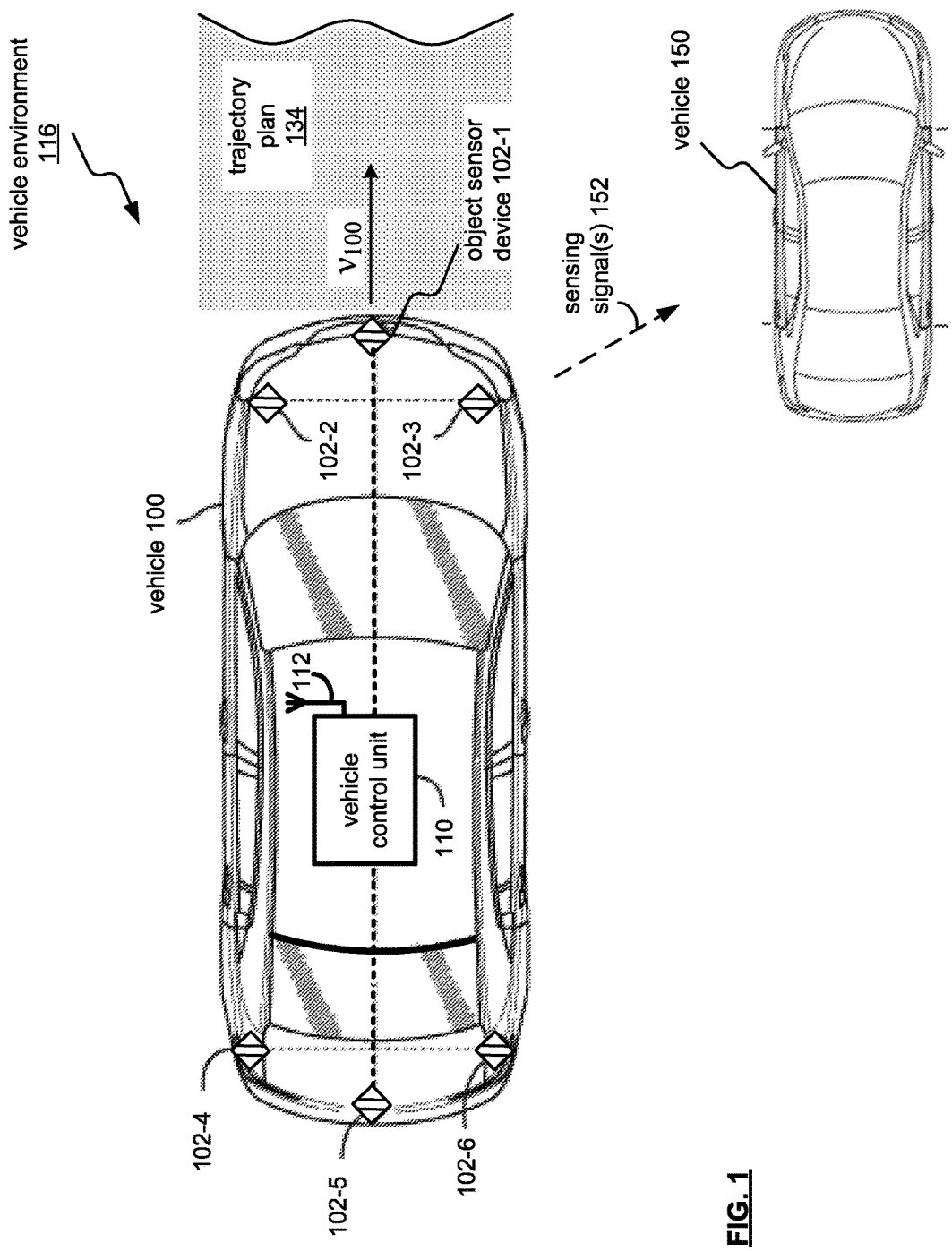
FIG. 1 is a schematic illustration of a vehicle including a vehicle control unit for providing autonomous vehicle operations in a vehicle environment.

Autonomous vehicle capability being configured for different, or heterogeneous, vehicle-types in a vehicle environment is described herein. An example method operates to configure autonomous decision-making based on a first dataset and a second dataset that includes a subset of the first dataset.

The first, or general, dataset relates to a set including passive environmental dynamics data for a plurality of vehicles in general (that is, including passenger vehicles, pickup trucks, suburban utility vehicles, recreational vehicles, etc.), and a second dataset including operational data relating to a subset of the plurality of vehicles of the first dataset. The subset may include one autonomous vehicle element (that is, a specific vehicle type and model), a common category of autonomous vehicle (such as a passenger vehicle, a SUV, a passenger truck, etc.), etc. The subset may operate to adapt a state value function and policy generated with the first dataset to the autonomous specific vehicle characteristics of the second dataset.

A general dataset for configuring a vehicle of a heterogeneous set of vehicles may include stored collected data based on passive dynamic collection (such as vehicle simulations on different roadway configurations). The general or first dataset may, being at a coarse granularity level, include multiple autonomous vehicle category levels, such as passenger vehicles, pickup trucks, suburban utility vehicles, recreational vehicles, etc. At a finer granularity level, the general dataset may be formed at a vehicle make level, such as, for example, Toyota. The autonomous models within the general dataset may include, for example, Toyota Tacoma, Toyota Camry, Toyota Corolla, etc.

In operation, the general, or first, dataset may be processed to generate a hierarchical-based vehicle configuration. At a first hierarchal stage, general and/or coarse reinforced learning (RL) principals may be considered to apply across the various categories of vehicles of the general dataset, such as motorized land vehicles. Other forms of general datasets may be formed based on motorized air vehicles, motorized water vehicles, etc., as a further example.

As may be appreciated, the general dataset may be "rooted" at a less coarse category of vehicles. For example, instead of being rooted with motorized land vehicles, the general dataset may be rooted with motorized four-door sedan land vehicles, such as Toyota Camry, Toyota Corolla, Toyota Prius, Toyota Avalon, etc.

As a simple example of a policy and state value at a generalized or coarse operational level, for a motorized land vehicle to merge with a freeway and/or causeway, the general understanding may be that the vehicle accelerates to merge with the traffic flow of the freeway and/or causeway. In an autonomous manner operating under RL principals, a motorized land vehicle may operate based on an acceleration policy that includes several successive acceleration states, and each acceleration state has an associated state value function to advance to the next acceleration state until an objective may be obtained.

Accordingly, at the first hierarchical stage (for first dataset), general state value functions and policies are "learned" and/or initialized based on the general, or first, dataset, which may be rooted with passive dynamics data for motorized street-legal vehicles. As may be appreciated, variances between passive dynamics data may result; however, considering the general dataset from a general viewpoint, operational policies and related state value functions trend towards normalization or a policy/state value consensus.

At the second hierarchical state, a subset of the general dataset (which also may be referred to as a second dataset) may be directed to one or many of categories of motorized land vehicles to adapt and/or hone the state value functions and policies "learned" at the first hierarchical stage to the subset. That is, the passive dynamics data of the first dataset relating to the category, or model, of the vehicle are honed by the second dataset as relating to the state value functions and policies for improving reinforced learning with respect to improved implementation while reducing active scanning that had been otherwise required for autonomous operations.

As may be appreciated, vehicle configuration for autonomous operation may be streamlined, minimizing the learning time that had been conventionally required on a vehicle-by-vehicle basis through utilizing the knowledge base provided by the general, or first, dataset.

That is, the first, or general, dataset, includes stored passive environmental dynamic data that relates to a present vehicle state ($X_k$) and a next vehicle state ($X_{k+1}$) processes that may generally apply to the plurality of vehicles for advancing towards a policy objective.

For example, in an acceleration policy $\pi$, the location and speed of the present vehicle state $X_k$ would be at a given and/or sensed value. The location and speed of the next vehicle state $X_{k+1}$ would be at a next location (down the road) and at a greater speed, etc. In this respect, the previously sampled, or passive environmental dynamic data, may apply to the plurality of vehicles in general, eliminating active sensor scanning of the vehicle environment at each vehicle state previously required for autonomous operations.

The second dataset, being a subset of the first or general dataset, may include an operational and/or control dynamics model directed to a portion of the plurality of vehicles. The portion may include a singular vehicle element (such as a vehicle make and model) or a plurality of elements (such as a model-type relating to four-door passenger vehicles). The control dynamics model may be identified in advance by using collected data in test courses or through simulation models.

For example, the subset of the plurality of vehicles may relate to a vehicle make, such as Toyota, or to make and model, such as Toyota Tacoma, Toyota Corolla, Toyota Camry, Toyota Prius, etc. That is, generally, the subset may include one autonomous vehicle element (that is, a specific vehicle type and model), a common category of autonomous vehicle (such as a passenger vehicle, a SUV, a passenger truck, etc.), etc. This subset and/or second dataset may be further broken out by model years, as well as specifics relating to the driving condition of a vehicle (such as model year, miles driven, driving nature (that is, conservative, reactive, etc.), repairs, maintenance record, etc.). In other words, the granularity of the control dynamics model may be at a coarse basis (such as the vehicle model) to a fine basis (such as individual/specific characteristics of the vehicle).

FIG. 1 is a schematic illustration of a vehicle 100 including a vehicle control unit 110 for providing autonomous operation capability in a vehicle environment 116. As may be appreciated, the vehicle 100 may be an automobile, light truck, cargo transport, or any other passenger or non-passenger vehicle.

A plurality of object sensor devices 102-1, 102-2, 102-3, 102-4, 102-5 and 102-6 (generally, object sensor devices 102) are in communication with the control unit 110 to assess a vehicle environment 116 with respect to a trajectory plan 134 for the vehicle 100. Trajectory information of the vehicle 100 (and autonomous vehicle states $X_k$) generally may include the trajectory plan 134, vehicle speed, vehicle make, vehicle model, firmware installation, destination point, and trajectory point operations (such as slowing, stops, turns, accelerations, merging with traffic flows, etc.) at various predetermined markers that may be located on GPS and/or mapping technologies.

Also, trajectory information may include intermediary autonomous vehicle objectives. That is, the vehicle control unit 110 may identify objectives as generally, static, such as turns at traffic signals, streets, accelerating or decelerating for traffic signal markers, etc. On the other hand, intermediary autonomous vehicle objectives may be dynamic (or non-static) as related to other vehicles, pedestrians, cyclists, etc. Examples of such autonomous vehicle objectives may include merging by the vehicle 100 into a traffic flow with other vehicles, such as via a merge lane onto a highway, from a present traffic lane to an adjacent traffic lane, from an exit lane to a frontage lane, etc., as is discussed in detail with reference to FIGS. 2-6.

The plurality of object sensor devices 102 may be positioned on the outer surface of the vehicle 100 or may be positioned in a concealed fashion for aesthetic purposes with regard to the vehicle 100. Communication between object sensor devices 102 and vehicle control units, including vehicle control unit 110, may be on a bus basis and may also be used or operated by other systems of the vehicle 100.

For example, the object sensor devices 102 may be coupled by a combination of network architectures such as a Body Electronic Area Network (BEAN), a Controller Area Network (CAN) bus configuration, an Audio Visual Communication-Local Area Network (AVC-LAN) configuration, and/or other combinations of additional communication-system architectures to provide communications between devices and systems of the vehicle 100.

The object sensor devices 102 may be provided by a Light Detection and Ranging (LIDAR) system, in which the object input devices 102 may capture data related laser light returns from physical objects in the environment 116 of the vehicle 100. The object sensor devices 102 may also include a combination of lasers (LIDAR) and milliwave radar devices. LIDAR and radar based devices may operate to sense objects along with a velocity (that is, relative and/or absolute velocities) of objects.

The object sensor devices 102 may, alone or in combination, operate to capture depth images or otherwise generate depth information for a captured image. For example, the object sensor devices 102 may be configured to capture images (visual and non-visual spectrum wavelengths, audible and non-audible wavelengths, etc.).

In this respect, the object sensor devices 102 are operable to determine distance vector measurements of the another vehicle 150 of the vehicle environment 116.

For example, each of the object sensor devices 102 may be configured to sense and/or analyze structured light, time of flight (e.g., of signals for Doppler sensing), light detection and ranging (LIDAR), light fields, and other information to determine depth/distance, direction and/or velocity of objects of the vehicle environment 116.

In operation, objects may be detected using multiples of the sensors 102-1 through 102-6 in combination or independently. In one example, object sensor devices 102-1, 102-2, and 102-3 may operate to detect objects ahead of the vehicle 100, and object sensor devices 102-4, 102-5 and 102-6 may operate to detect objects behind the vehicle 100.

Also, each of the object sensor devices 102 may implement respective functions to provide a collective object parameter detection based on respective spatial portions. For example, object sensor device 102-1 may operate to detect an object such as the another vehicle 150, and object sensor device 102-2 may operate to detect an object velocity of the another vehicle 150 relative to the vehicle 100. Further, object sensor device 102-3 may operate in combination with object sensor device 102-1 to corroborate a sensing and/or detection of an object. As may be appreciated, an object's relative velocity may be determined via an object sensor device 102, may be extrapolated by successive position detection measurements of the object, and calculating speed and/or direction of motion based thereon (such as to form a motion vector).

Also, respective subsets of object sensor devices 102 may operate in combination with other subsets of object sensor devices, and may also operate in an alternately or asynchronously, simultaneously, or individually based manner for a desired sensing function and/or application.

In operation, the vehicle control unit 110 may operate to receive vehicle sensor data that can be output by object sensor devices 102. The object sensor devices 102 may capture and send vehicle sensor data related to laser returns from physical objects in the area surrounding the vehicle 100, while traveling at a velocity $V_{100}$, along a trajectory plan 134. As an example, signal returns of the sensing signal(s) 152 may indicate vehicle route markings, such as a center line, lane lines, and edges of the trajectory plan 134, traffic signage, etc., as well as other vehicles.

As may be appreciated, the vehicle control unit 110 may operate to select an autonomous vehicle objective for a vehicle environment 116. The autonomous vehicle objective may be based on the trajectory plan 134 and/or short-term autonomous control by the vehicle control unit 110. With respect to the autonomous vehicle objective, the vehicle control unit 110 may identify a set of autonomous vehicle states, and determine whether objects of the vehicle environment 116 affect an autonomous vehicle objective.

When other static and/or dynamic objects of the vehicle environment 116 affect an autonomous vehicle objective, the vehicle control unit 110 may operate to progress through the set of autonomous vehicle states to achieve the autonomous vehicle object, while also accounting for the discerned vehicular states of the objects, such as the another vehicle 150. The vehicle control unit 110 may operate to form an adaptive policy to a present one of the set of autonomous vehicle states for the vehicle 100

An adaptive control policy t may operate to form an autonomous vehicle action to progress to a subsequent one of the set of autonomous vehicle states of the vehicular objective. The vehicle control unit 110 may transmit the vehicular action for effecting a progression to the subsequent one of the set of autonomous vehicle states. By recursively progressing through the set of vehicle states in such a manner, the vehicle control unit 110 may satisfy the autonomous vehicle objective in the vehicle environment 116, as discussed in detail with reference to FIGS. 2-6.

Figure 2:
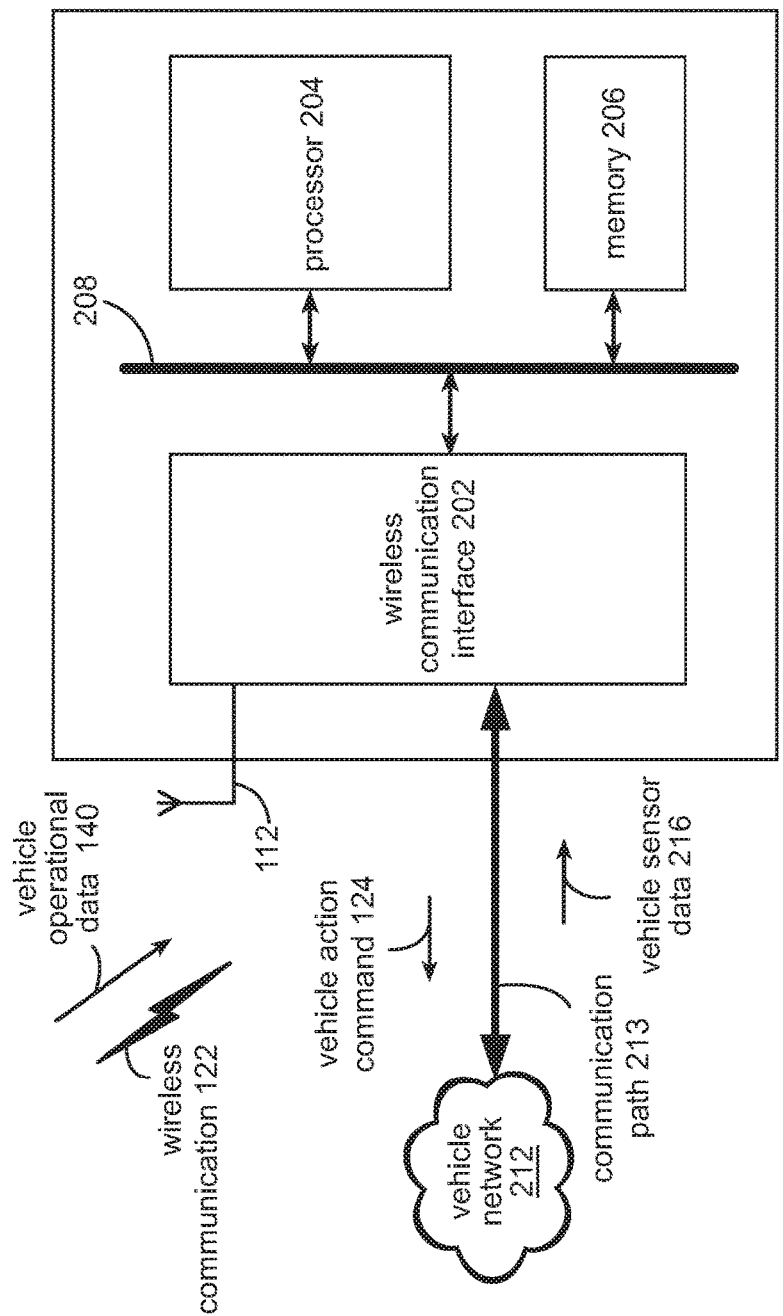
FIG. 2 illustrates a block diagram of the vehicle control unit of FIG. 1.

FIG. 2 illustrates a block diagram of a vehicle control unit 110 of FIG. 1. FIG. 2 is a block diagram of a vehicle control unit 110, which includes a wireless communication interface 202, a processor 204, and memory 206, that are communicably coupled via a bus 208. The vehicle control unit 110 may provide an example platform for the device and methods described in detail with reference to FIGS. 1-6.

The processor 204 can be a conventional central processing unit or any other type of device, or multiple devices, capable of manipulating or processing information. As may be appreciated, processor 204 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory (and/or memory element) 206 may be communicably coupled to the processor 204, and may operate to store one or more modules described herein. The modules can include instructions that, when executed, cause the processor 204 to implement one or more of the various processes and/or operations described herein.

The memory and/or memory element 206 may be a single memory device, a plurality of memory devices, and/or embedded circuitry of the processor 204. Such a memory device may be a read-only memory, random access memory, volatile memory, non-volatile memory, static memory, dynamic memory, flash memory, cache memory, and/or any device that stores digital information. Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium.

The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any, suitable combination of the foregoing. In the context of this document, a computer-readable storage medium may be any tangible medium that can contain, or store a program for use by or in connection with an instruction execution system, apparatus, or device. Program code embodied on a computer-readable medium may be transmitted using any appropriate medium, including but not limited to wireless, wireline, optical fiber, cable, RF, etc., or any suitable combination of the foregoing.

The memory 206 is capable of storing machine readable instructions, or instructions, such that the machine readable instructions can be accessed by the processor 204. The machine readable instructions can comprise logic or algorithm(s) written in programming languages, and generations thereof, (e.g., 1GL, 2GL, 3GL, 4GL, or 5GL) such as, for example, machine language that may be directly executed by the processor 204, or assembly language, object-oriented programming (OOP) such as JAVA, Smalltalk, C++ or the like, conventional procedural programming languages, scripting languages, microcode, etc., that may be compiled or assembled into machine readable instructions and stored on the memory 206. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 204 includes more than one processing device, the processing devices may be centrally located (e.g., directly coupled together via a wireline and/or wireless bus structure) or may be distributed (e.g., cloud computing via indirect coupling via a local area network and/or a wide area network). Further note that when the processor 204 implements one or more of its functions via a state machine, analog circuitry, digital circuitry, and/or logic circuitry, the memory and/or memory element storing the corresponding operational instructions may be embedded within, or external to, the circuitry including the state machine, analog circuitry, digital circuitry, and/or logic circuitry.

Still further note that, the memory 206 stores, and the processor 204 executes, hard coded and/or operational instructions of modules corresponding to at least some of the steps and/or functions illustrated in FIGS. 1-6.

The vehicle control unit 110 can include one or more modules, at least some of which are described herein. The modules can be implemented as computer-readable program code that, when executed by a processor 204, implements one or more of the various processes described herein. One or more of the modules can be a component of the processor(s) 204, or one or more of the modules can be executed on and/or distributed among other processing systems to which the processor(s) 204 is operatively connected. The modules can include instructions (e.g., program logic) executable by one or more processor(s) 204.

The wireless communication interface 202 generally governs and manages the data received via a vehicle network 212. There is no restriction on the present disclosure operating on any particular hardware arrangement and therefore the basic features herein may be substituted, removed, added to, or otherwise modified for improved hardware and/or firmware arrangements as they may develop.

The antenna 112 may include one or more conductive elements that interact with electromagnetic signals transmitted by global positioning system satellites. The received signals may be transformed into a data signal indicative of the location (for example, latitude and longitude positions), and further indicative of the positioning of the vehicle with respect to road data.

The vehicle control unit 110 may be communicatively coupled to receive signals from global positioning system satellites, such as via the antenna 112 of the vehicle control unit 110, or other such vehicle antennae (not shown). The antenna 112 operates to provide communications with the vehicle control unit 110 through wireless communication 112. As may be appreciated, the wireless communication 112 may operate to convey vehicle-to-vehicle (V2V) communications, vehicle-to-infrastructure (V2I) communications, and/or data/cellular communications, to receive vehicle operational data 140 that may relate to another vehicle 150 (FIG. 1).

The wireless communication 122 may be based on one or many wireless communication system specifications. For example, wireless communication systems may operate in accordance with one or more standards specifications including, but not limited to, 3GPP (3rd Generation Partnership Project), 4GPP (4th Generation Partnership Project), 5GPP (5th Generation Partnership Project), LIE (long term evolution), LTE Advanced, RFID, IEEE 802.11, Bluetooth, AMPS (advanced mobile phone services), digital AMPS, GSM (global system for mobile communications), CDMA (code division multiple access), LMIDS (local multi-point distribution systems), MMDS (multi-channel-multi-point distribution systems), IrDA, Wireless USB, Z-Wave, Zig-Bee, and/or variations thereof.

As may be appreciated, the communication path 213 of the vehicle network 212 may be formed from a medium suitable for transmitting a signal such as, for example, conductive wires, conductive traces, optical waveguides, or the like. Moreover, the communication path 213 can be formed from a combination of mediums capable of transmitting signals.

In one embodiment, the communication path 213 may include a combination of conductive traces, conductive wires, connectors, and buses that cooperate to permit the transmission of electrical data signals to components such as processors, memories, sensors, input devices, output devices, and communication devices.

Accordingly, the communication path 213 may be provided by a vehicle bus, or combinations thereof, such as for example, a Body Electronic Area Network (BEAN), a Controller Area Network (CAN) bus configuration, an Audio Visual Communication-Local Area Network (AVC-LAN) configuration, a Local Interconnect Network (LIN) configuration, a Vehicle Area Network (VAN) bus, and/or other combinations of additional communication-system architectures to provide communications between devices and systems of the vehicle TOO.

The term "signal" may be understood to relate to a waveform (e.g., electrical, optical, magnetic, mechanical or electromagnetic), such as DC, AC, sinusoidal-wave, triangular-wave, square-wave, vibration, and the like, capable of traveling through at least some of the media described herein.

Respective modules of the vehicle control unit 110, and associated instructions, when executed by the processor 204, cause the processor 204 to receive vehicle sensor data 216 from object sensor device(s) 102 (FIG. 1), and produce, at least based in part on the vehicle sensor data 216, an autonomous vehicle action command 124, as is discussed in detail with reference to FIGS. 3-6.

Figure 3:
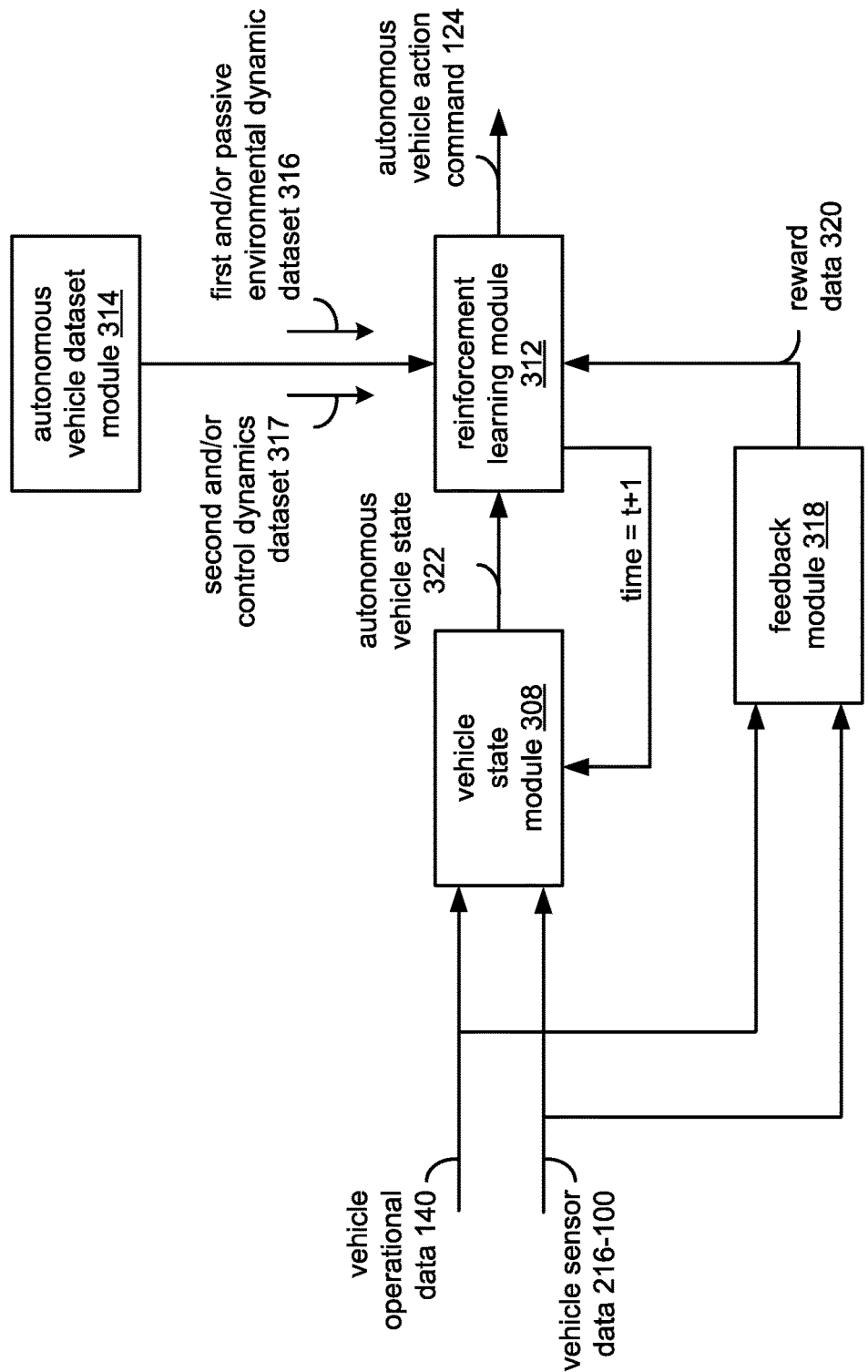
FIG. 3 illustrates a functional module block diagram with a reinforcement learning structure for autonomous vehicle operation in a vehicle environment.

FIG. 3 illustrates a functional module block diagram stored in a memory 206 for the vehicle control unit 110, where memory 206 may store a vehicle state module 308 and a reinforcement learning module 312. The memory 206 may also store a feedback module 318, and an autonomous vehicle dataset module 314.

The vehicle state module 308 may receive vehicle sensor data 216-100 and/or operational data 140 for another vehicle. With respect to data relating to an autonomous vehicle state 322 for the vehicle 100, vehicle sensor data 216-100 relates to vehicle sensor data 216 relating to operation of the vehicle 100 (for example, vehicle speed sensor (VSS) data output, inertial measurement unit (MU) data output, etc.) and static and/or dynamic objects relative to the vehicle 100.

Based on the vehicle operational data 140 and/or the vehicle sensor data 216-100, the vehicle state module 308, via instructions that when executed by the processor, cause the processor to, based on a first portion of the plurality of vehicle sensor devices, discern a vehicular state vehicle environment to produce an autonomous vehicle state.

For example, when the autonomous vehicle objective may be to merge with a traffic flow (such as onto a roadway and/or freeway), other objects such as another vehicle may affect the autonomous vehicle objective because when the autonomous vehicle does not factor that vehicle's operational state, a collision and/or evasive action may need to occur. In this respect, the objective of the merge may be a safe transition into the flow, with sufficient autonomous vehicle spacing and without collision with the another vehicle (or other vehicles generally).

The reinforcement learning module 312 operates to receive the autonomous vehicle state 322 based on vehicle sensor data 216-100 and/or vehicle operational data 140 relative to an autonomous vehicle 100. As may be appreciated, reinforcement learning structures had relied on actively sampling an environment to generate control dynamics model 317 to base an autonomous vehicle action command 124. Active exploration cost may be excessive, and as a result unacceptable for an autonomous vehicle to optimistically attempt maneuvers that may lead to a collision or near-miss because of the time and processing and sampling overhead to arrive at a timely action decision.

Accordingly, the reinforcement learning module 312 may be configured in a two-stage configuration based on the passive environmental dynamic dataset 316 accessed via an autonomous vehicle dataset module 314. The autonomous vehicle dataset module 314 operates to sample, develop, and store in the memory 206 a partially-known system dynamics model relating to a vehicle, such as vehicle 100. In other words, the passive environmental dynamic dataset 316 has been populated as a general dataset including a passive dynamic data for a plurality of vehicles in general (that is, including passenger vehicles, pickup trucks, suburban utility vehicles, recreational vehicles, etc.), and a second dataset including operational data relating to a subset of the plurality of vehicles of the first dataset. The subset may include one autonomous vehicle element (such as that of vehicle 100 having a specific vehicle type and model), a common category of autonomous vehicle (such as a passenger vehicle, a SUV, a passenger truck, etc.), etc. The subset may operate to adapt a state value function and policy generated with the first dataset to the autonomous specific vehicle characteristics of the second dataset.

The model may include (a) control dynamics model and/or data 317 and (b) passive environmental dynamic dataset 316, which may also be referred to a first dataset. The control dynamics model 317 corresponds with autonomous control (speed parameter, direction parameter, acceleration parameter, deceleration parameter, etc.) of the vehicle 100. The passive environmental dynamic dataset 316 may be vehicle independent (such as average speed samplings in the context of roadway, past interaction/simulation with other vehicles and/or objects, weather conditions in the environment, etc.), may be passive because the environmental dynamics data is not being generated from active, or real-time, sensor scans instead, the data may be based on previously collected and stored state transition and/or simulation data corresponding with the vehicle 100.

In this manner, the environmental dynamics dataset 316 may relate to a road portion of a trajectory plan 134 based on position-and-vector data associated with the vehicle 100, and to position-and-vector data associated with the objects, such as another vehicle.

Feedback module 318 receives another vehicle operational data 140 and/or vehicle sensor data 216-100, and determines reward data 320 that correspond to the results and/or effect of the autonomous vehicle action command 124. Further rewards, or reinforcements, data may be determined based on the autonomous vehicle state 322 in relation to vehicle sensor data 216-100.

Figure 4:
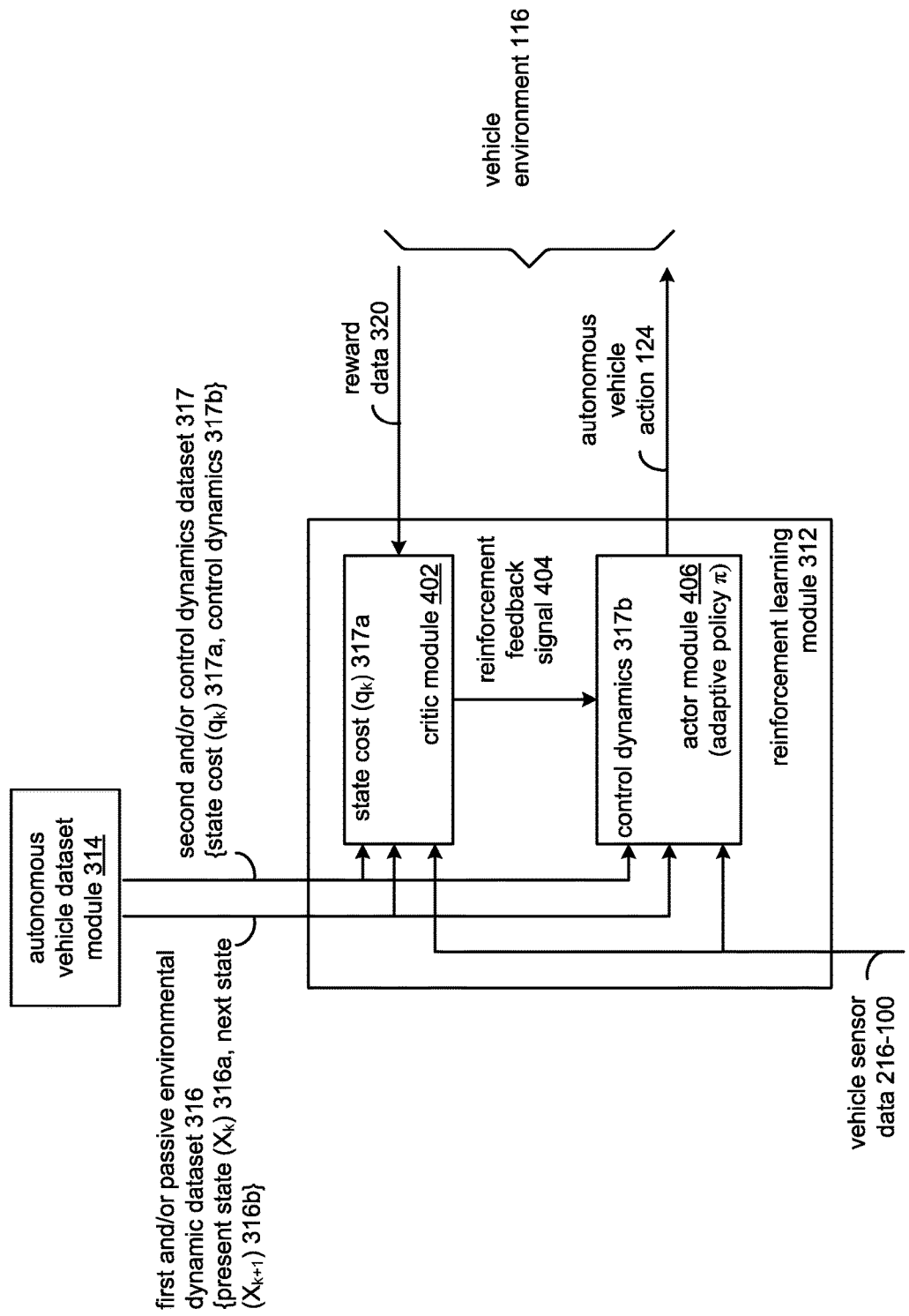
FIG. 4 illustrates a functional module block diagram of an example of a reinforcement learning module of FIG. 3.

FIG. 4 illustrates a functional module block diagram of an example of a reinforcement learning module 312 of FIG. 3. As may be appreciated, reinforcement learning (RL) is a form of machine learning, and may be considered as an aspect of Artificial Intelligence (AI). An objective of reinforcement learning module 312 is to predict state values following a policy decision, and to change the policy towards achieving an optimal policy. For example, for acceleration, the policy decision may be to continue to accelerate, with the optimal policy being to accelerate at a rate to achieve the next state. The prediction is to achieve the next state, which may be measured by distance covered. The reward data would relate to the success of attaining the next state based on the optimal policy.

The reinforcement learning module 312 may include a critic module 402 and an actor module 406. An autonomous vehicle dataset module 314 operates to provide passive environmental dynamic dataset 316 and control dynamics model 317 to the RL module 312.

The autonomous vehicle dataset module 314 may include sensor and/or simulated data samples of dynamics in relations to vehicle environments. The autonomous vehicle dataset module 314 may operate so that the reinforcement module 312 does not need to engage in active environment scanning.

For example, reinforcement learning systems generally form action decisions based on active environmental scanning when at a present state $X_k$, in order to progress to a next state $X_{k+1}$. As a result, progression to a next state $X_{k+1}$ may become dependent upon the sensing and/or processing latency of components relied upon for forming the next action, such as sensor sampling rates, processor clocking speed, memory speed, etc.

As noted earlier, active scanning may impose unacceptable delays in the application of autonomous vehicle operations, and also, such delays may cause an initial environmental assessment to become stale. As a result, the action decision formed after the delay may no longer be the optimal action deployed by the autonomous operation.

As may be appreciated, the autonomous vehicle dataset module 314 may operate to provide a first dataset of the passive environmental dynamic dataset 316, which is collected from "present state next state transitions" (that is, $X_k \rightarrow X_{k+1}$) relating to a plurality of vehicles. As may be appreciated, the passive environmental dynamics dataset 316 may be generated from data recording of state progressions by the different vehicles, and/or from data recording developed of state progressions by simulated operation of different vehicles forming the plurality of vehicles.

The autonomous vehicle dataset module 314 may also operate to provide a second dataset of control and/or operational dynamics for a portion or subset of the plurality of vehicles forming the first dataset (that is, the passive environmental dynamics dataset 316). As may be appreciated, the portion of the plurality of vehicles may relate to a vehicle class (such as economy class, family class, sedan class, luxury class, sport class, sport utility class, etc.). The portion of the plurality of vehicles may in the alternative, or in combination, relate to vehicle manufacturer (such as Toyota), vehicle model (such as a Toyota Tacoma, Toyota Corolla, Toyota Camry, Toyota Prius, etc.

The portion may be further broken out by model years, as well as specifics relating to the driving condition of a vehicle (such as model year, miles driven, driving nature (that is, conservative, reactive, etc.), repairs, maintenance record, etc.). In other words, the granularity of the control dynamics model 317 may be at a coarse basis (such as the vehicle model) to a fine basis (such as specific characteristics of the vehicle).

In this respect, the autonomous vehicle dataset module 314 may operate to provide the reinforcement leaning module 312 with the ability to provide continuous state and action spaces that may engage in machine learning based on less system knowledge and without requiring active environment sensing and/or exploration. Also, the autonomous vehicle dataset module 314 may provide for optimizing an autonomous policy it, and resulting autonomous vehicle action 124, for different vehicles of the plurality of vehicles.

In other words, apart from reducing overhead required by active, real-time (or near real-time) sensing and/or exploration of a vehicle environment, the autonomous vehicle dataset module 314 may operate to accommodate different control dynamics models for different vehicles of the plurality of vehicles. That is, the autonomous vehicle dataset module 314 may configure a reinforcement learning module 312 in short order, where doing so had required collecting environment and operational data tailored to the specific vehicle platform (that is, manufacturer, class, model, year, etc.).

In this respect, a state value function of the critic module 402 may be based on passive environmental dynamic dataset 316, which may include data relating to a present state 316a and data relating to a next state 316b.

Also, a control gain of the actor module 405 (and adaptive policy n) may, be optimized based on the control dynamics mode 317, which may include state cost 317a and control dynamics 317b.

The critic module 402 operates to provide state evaluation by generating a reinforcement feedback signal 404, which may be based on observing consequences of the autonomous vehicle action 124 via reward data 320 and the vehicle sensor data 216-100. As may be appreciated, the critic module 402 may take the form of a temporal difference error, which produces indications as to whether an action has gone better, or worse, than expected with a preceding autonomous vehicle action 124.

When the temporal difference is positive, the tendency towards again selecting action of that autonomous vehicle action 124 would be strengthened. As a general example of reward data, a positive reward may indicate successfully following a desired trajectory, while a negative reward may indicate a collision (or not successfully following a desired trajectory).

An example of learning a state value function in view of the first and/or passive environmental dynamic dataset 316 (based on an iteration of i=1 to N) including a state $X_k$, a next state $X_{k+1}$, and the state cost $q_k$, (which may be provided as state cost 317a relating to specific performance characteristics of a vehicle 100) may be represented by the following:

$$e_{k_i} \leftarrow \hat{Z}_{avg}\hat{Z}_k^i - \exp(-q_k)\hat{Z}_{k+1}^i$$

update $v^i$ with gradient $\nabla_{v^i}(\hat{Z}_{avg}\hat{Z}_k^i - Z_{avg}Z_k)^2$ $$\hat{Z}_{avg}^{i+1} \leftarrow \hat{Z}_{avg}^i - \alpha_1^i e_k^i$$

where:
 k denotes a time index;
 $Z_k$ is an exponentially transformed value function (also referred to as "Z-value), and $Z_{avg}$ is the average cost under an optimal policy $\pi$;
 $\hat{Z}$ is an estimated Z-value function;
 v is a parameter vector;
 $e_k^i$ is the temporal difference (TD) error (where i denotes the iteration); and
 $\alpha_1^i$ is a learning rate as a function of the iteration i.

The actor module 406 may operate to provide a policy $\pi$ improvement, and may include a policy $\pi$ component including the behavior function of the actor module 406. In other words, a value function indicates how "good" an autonomous vehicle action 124 may be expected to perform (that is, the future reward), and model representation of the multi-vehicle environment 116. The policy $\pi$ may be considered as the vehicle's behavior as may be mapped from an autonomous vehicle state to an autonomous vehicle action 124.

As may be appreciated, the policy a may be a deterministic policy (for example, action "a" equals $\pi$ (state "s")), or may be a stochastic policy where the policy $\pi$ (action "a"|state "s") equals probability P [$A_t$=action "a" 124|$S_t$=state "s"] for the next autonomous vehicle state in a Markov progression.

The actor module 406 may be considered as Markovian, in which the future of the autonomous operation depends on a current state (position, speed, direction, etc.), and the autonomous vehicle action 124. A Markov Decision Process defined by {S, A, ρ, r, γ}, where S is set of states, A(s) set of actions possible in state S, ρ is probability of transition from a state S, r is expected reward when executing autonomous vehicle action A at a State S, and γ is discount rate for the expected reward r.

The actor module 406 may operate to learn a control gain based on the control dynamics model 317 for a portion of a plurality of vehicles. An example of learning the control gain in view of the control dynamics model 317 (based on an iteration of i=1 to N) including a state $X_k$, a next state $X_{k+1}$, and the state cost $q_k$, may be represented by the following:

$$V_k^i \leftarrow -\ln \hat{Z}_k, \hat{V}_{k+1}^i \leftarrow -\ln \hat{Z}_{k+1}, \hat{V}_{avg}^i \leftarrow -\ln \hat{Z}_{avg}$$

$$V_k^i \leftarrow \nabla_{x_k} \hat{V}_k^i$$

$$d_k^i = q_k \Delta t + 0.5 \hat{V}_k^{iT} B_k \hat{S}^i B_k^T \hat{V}_k^i \Delta t + \hat{V}_{k+1}^i - \overline{V}_{avg} - \hat{V}_k^i$$

$$\hat{S}^{i+1} \leftarrow \hat{S}^i - \beta^i d_k^i \nabla_{\hat{S}} d_k^i$$

where:
V is the V-value function V(x);
$d_k^i$ is the reward function (or Temporal Displacement (TD) error);
$q_k$ is the state-cost; and
$\beta^i$ is the learning rate
in this manner, the actor module 406 may operate to improve the policy π by computing the state S using estimated Z-values from the critic module 402.

As noted, in a passive actor-critic structure for the reinforcement learning module 312, two hierarchical datasets may be used. The first dataset may be the passive dynamic data 316 collected on passive state transitions (that is, sampled and/or simulated vehicle action in relation to the environment 116). The second dataset may be the known operational and/or control dynamics model 317 for the autonomous vehicle 100, which may be understood to be a portion of the plurality of vehicles relating to the first dataset of the passive environmental dynamic dataset 316.

As may be applied to a linearly-solvable continuous Markov Decision Process (L-MDP), the critic module 402 may estimate an estimated value functions based on a linearized Bellman (B) equation, from the passive environmental dynamic data 316, while the actor module 406 may operate to optimize a policy π (producing autonomous vehicle action 124) based on a standard Bellman (B) equation on the passive dynamic data 316 and a control dynamics model 317b for the autonomous vehicle 100.

In this regard, an autonomous vehicle capability may be implemented to generate an autonomous vehicle action command based on the state value function of the critic module 402 in cooperation with a policy control gain of the actor module 406.

Figure 5:
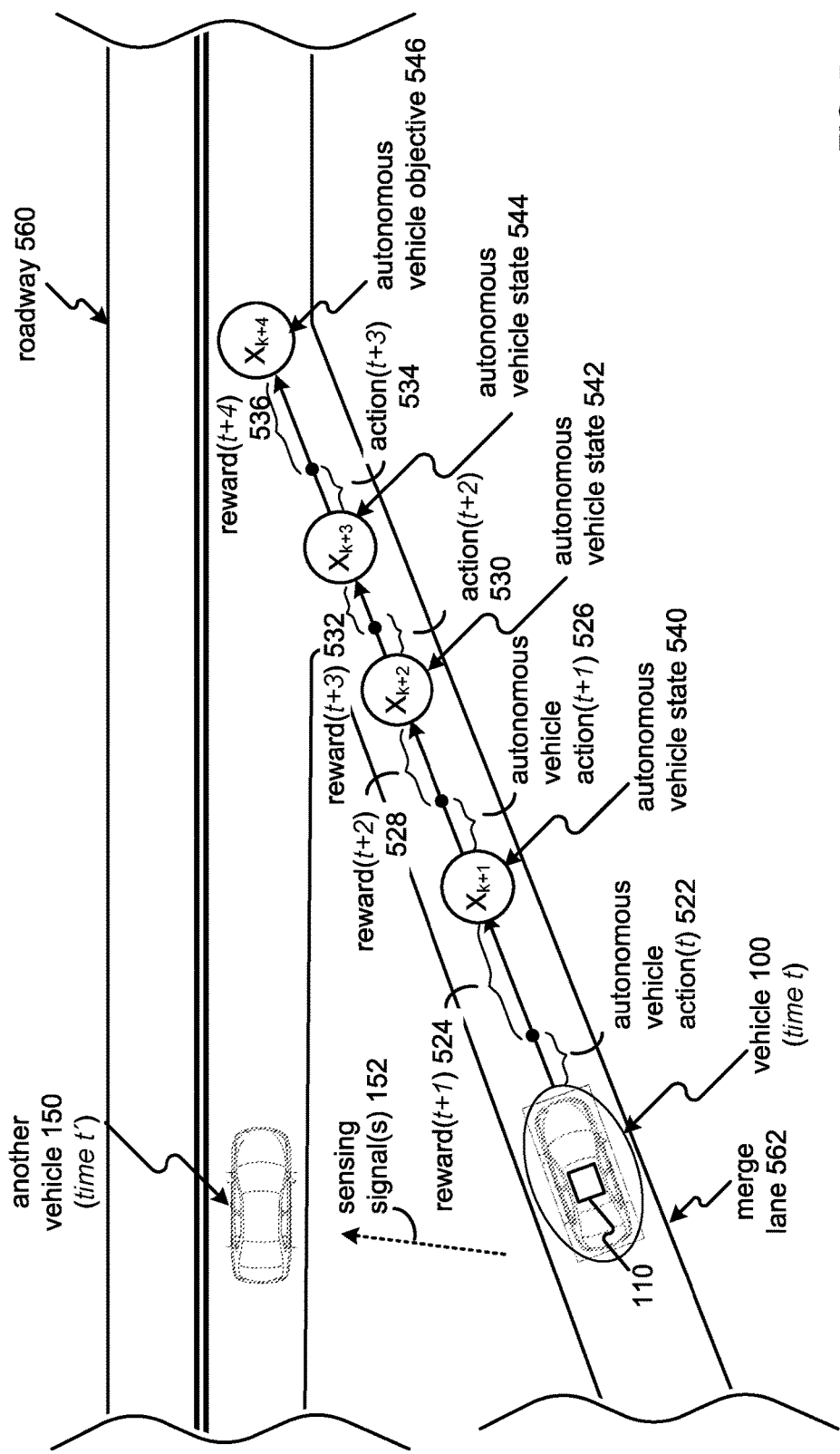
FIG. 5 illustrates an example of a vehicle environment including a vehicle having autonomous vehicle capability.

FIG. 5 illustrates an example of a multi-vehicle environment 116 including a vehicle 100 merging into a roadway 560. The vehicle 100 selects an autonomous vehicle objective 546 (that is, merging with the roadway), and identifies a set of autonomous vehicle states 540, 542, 544, and 546, relating to the autonomous vehicle objective, which for the present example is to merge the vehicle 100 with the traffic flow of roadway 560. The autonomous vehicle states 540, 542, 544, and 546, may be indicated by a discrete sampling interval by the vehicle control unit 110, and generally selected so as to avoid under sampling and/or oversampling the progression of the vehicle 100 towards the autonomous vehicle objective 546. As may be appreciated, the number of autonomous vehicle states may increase/decrease based upon the discrete sampling interval.

With respect to a passive actor-critic structure of the reinforcement learning module 312 (FIG. 4), passive environmental dynamic data 316 allows for an optimal policy π (that is, increasing speed over a given distance to merge from a merge lane 562 with a traffic flow of a roadway 560) by the autonomous vehicle 100. As may be appreciated, the passive environmental dynamic dataset 316 may be collected through other vehicles previously engaging in the same or similar operation and/or objectives, and may also be generated with respect to simulations to generate the dataset 316.

As may be appreciated, an optimal policy π is not based on an active exploration of the vehicle environment 116 to identify each of the physical characteristics for the autonomous vehicle objective 546—that is, merging with a flow of traffic (such as the length of the merge lane 562, the average speed for the merge lane 562, the speed to accelerate to effect a merge with the traffic flow of the roadway 560, etc.). Instead, these characteristics have been collected passively and/or simulated to render an environmental model for use by the reinforcement learning module 312 of the vehicle control unit 110, reducing time to form an autonomous vehicle action 124 that would otherwise be allotted for environment and/or situation assessment.

The passive environmental dynamic set 316 may also include variations based on prior and/or simulated scenarios of other vehicles, such as another vehicle 150 being present in the roadway 560, which may affect the autonomous vehicle objective 546. For example, the another vehicle 150 may intercept the autonomous vehicle objective 546 at or about the time of the vehicle 100. In this respect, a possibility of a collision and/or near-miss between the vehicle 100 and the another vehicle 150 may result.

As may be appreciated, other example scenarios may occur where another vehicle 150 affects an autonomous vehicle objective of an autonomous vehicle 100, such as merging from a present traffic lane to an adjacent traffic lane including the another vehicle, merging from an exit lane to a frontage lane including the another vehicle, etc. Also, for simplicity of the example, one vehicle 150 is shown to affect an autonomous vehicle objective. In heavier traffic flow conditions, several other vehicles may affect an autonomous vehicle objective, and further sensing and discerning of vehicle states for additional other vehicles may be implemented to adjust the approach of autonomous vehicle 100 towards an autonomous vehicle objective 546.

In operation, the vehicle control unit 110 may discern the state of the vehicle 150 (such as relative position, speed, heading, etc.) based on sensing signal(s) 152 (and their respective returns).

In this respect, the vehicle control unit 110 may operate to take into consideration the movement of the another vehicle 150 on an iterative basis in forming an adaptive policy π to form an autonomous vehicle action (e.g., level of acceleration (m/s²)) to progress to a subsequently autonomous vehicle state 540 towards the autonomous vehicle objective 546.

The vehicle control unit 110 forms an adaptive policy π to a present autonomous vehicle state at time t relative to the discerned vehicular state X at a time t' of the another vehicle 150. From the adaptive policy π, an autonomous vehicle action(t) 522 is produced to progress from the present autonomous vehicle state at time t to a subsequent one of the set of autonomous vehicle states S at time t+1. For clarity, the autonomous vehicle action may relate to the velocity of the autonomous vehicle based on an adaptive policy π that may be based on a relative velocity of the autonomous vehicle 100 with the another vehicle 150 sufficient to merge from the merge lane 562 to the roadway 560.

The autonomous vehicle action(t) 522 may be transmitted for effecting the progression to the subsequent one of the set of autonomous vehicle states. That is, the autonomous vehicle action(t) 522 may be provided to other vehicle control units of the autonomous vehicle 100, such as a powertrain control unit, which may operate to produce control data based on autonomous vehicle action(t) 522, autonomous vehicle action(t$_1$) 526, autonomous vehicle action(t+2) 530, etc., to vehicle powertrain actuators.

As may be appreciated, other vehicle control units of the vehicle 100 may have similar structures such as the vehicle control unit 110 (FIG. 2). Also, the term "powertrain" as used herein describes vehicle components that generate power and deliver the power to the road surface, water, or air, and may include the engine, transmission, drive shafts, differentials, and the final drive communicating the power to motion (for example, drive wheels, continuous track as in military tanks or caterpillar tractors, propeller, etc.). Also, the powertrain may include steeling wheel angle control, either through a physical steering wheel of the vehicle 100, or via drive-by-wire and/or drive-by-light actuators.

As shown in FIG. 5, a progression to a subsequent state of the set of autonomous vehicle states includes an autonomous vehicle action portion related to a present time (t), and a perceived value or reward portion at a future time interval (t+1) relative to the subsequent autonomous vehicle state (for example, a reward (t+1) for autonomous vehicle state 540 at $S_{t+1}$). In a reinforcement learning module 312 based on passive actor-critic modules (FIG. 4), a critic module 402 may operate to evaluate the perceived reward 524 to determine whether it was achieved, and further adapt a policy t of the actor module 406 (FIG. 4) as appropriate via reinforcement feedback signal 404.

Accordingly, for progressing to subsequent autonomous vehicle state 542 from autonomous vehicle state 540, with a discerned vehicular state 502 (e.g., change in distance of the another vehicle 150 from time t to time (t+1), and velocity $v_{t'+1}$ m/s), the autonomous vehicle 100 implements autonomous vehicle action (t+1) 526 (e.g., acceleration $a_{t+1}$ m/s$^2$) with a perceived reward (t+2) 52.8 (e.g., distance $d_{t+1}$ meters ahead or behind of the another vehicle 150)).

As may be appreciated, the autonomous vehicle action from one autonomous vehicle state 540, 542, 544, and 546, may be dissimilar to one another. Also, the velocity and/or acceleration of the another vehicle 150 may not be constant from a discerned vehicular state $S_{t'}$ through discerned vehicular state and initial time t'.

Figure 6:
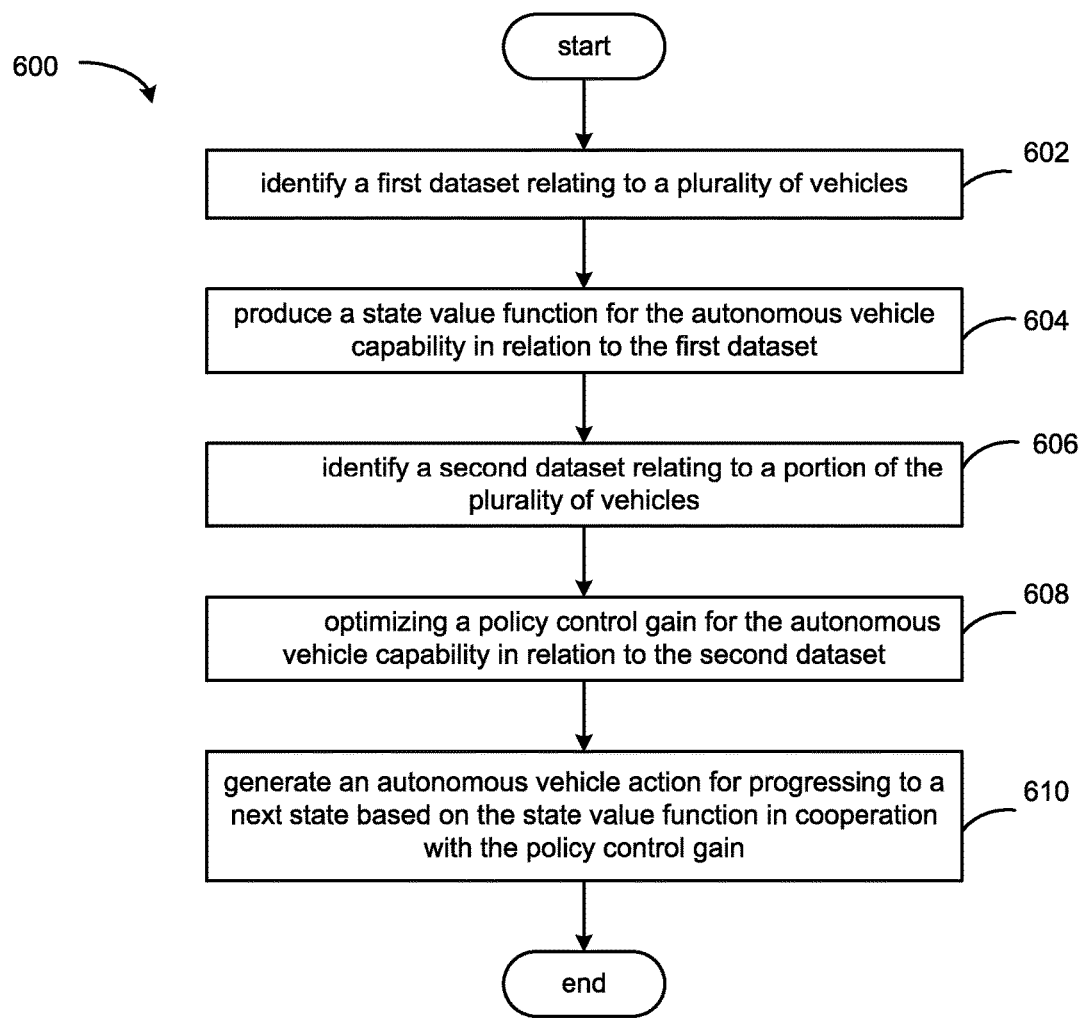
FIG. 6 illustrates an example process for configuring an autonomous vehicle capability of a vehicle.

FIG. 6 illustrates an example process 600 for configuring an autonomous vehicle capability of a vehicle.

At operation 602, a first dataset of hierarchical datasets relating to a plurality of vehicles is identified, where the vehicle is one of the plurality of vehicles. With respect to the first dataset, a state value function may be produced at operation 604 for the autonomous vehicle capability in relation to the first dataset. An example of the first dataset is that of passive environmental dynamic dataset relating to a plurality of vehicles, the passive environmental dynamic dataset including present state and next state data. As may be appreciated, the passive environmental dynamic dataset may be considered to relate to progressing over a plurality of states towards a state objective. That is, to achieve the object, general fundamental actions take place whether the vehicle is a sports vehicle, a cargo vehicle, etc.

At operation 606, a second dataset, or subset, of hierarchical datasets may be identified relating a portion of the plurality of vehicles, where the portion of the plurality of vehicles include the vehicle, such as vehicle 100 (see FIG. 1).

The second dataset may include a operational and/or control dynamics model for a portion of the plurality of vehicles. The control dynamics model may include vehicle state cost data and control dynamics data. For example, the portion of the plurality of vehicles may relate to vehicle models, such as a Toyota Tacoma, Corolla, Camry, Prius, etc. The portion may be further broken out by model years, as well as specifics relating to the driving condition of a vehicle (such as model year, miles driven, driving nature (that is, conservative, reactive, etc.), repairs, maintenance record, etc.). In other words, the granularity of the operational and/or control dynamics model may be at a coarse level (such as the vehicle model) to a fine level (such as individual qualities on the vehicle).

In other words, the second dataset may be considered to relate to the respective capabilities of a portion of the plurality of vehicles to progress through the states to an objective. For example, a sports vehicle may be generally "nimble," or responsive to an action command, while a cargo vehicle may be more cumbersome and less nimble. Accordingly, the second dataset may include a control dynamics model for the portion of the plurality of vehicles that may include state cost data and control dynamics data.

In relation to the second dataset, a policy control gain may be optimized and directed to the vehicles particular performance characteristics for implementation with the autonomous vehicle capability at operation 608. In this respect, the autonomous vehicle capability may be configured to be deployed with a reinforcement learning module 312 (FIG. 3).

At operation 610, the autonomous vehicle capability of the vehicle may operate to generate an autonomous vehicle action for progressing to a next state based on the state value function in cooperation with the policy control gain, such as that described the example of FIG. 5.

For example, when the reinforcement learning (RL) module includes an actor-critic module, an actor module can be operable to generate a prediction of an action of the autonomous vehicle capability based on an adaptive policy generated from the two-stage hierarchical configuration of a first and/or passive environmental dynamic dataset and a second and/or control dynamics dataset, which may be subset of the first dataset.

The critic module may be operable to produce feedback data for the actor module relating to a reward parameter responsive to the first dataset and the second dataset, wherein the critic module, via the feedback data, further operates to modify a policy parameter of the actor module to form an adaptive policy π. As may also be appreciated, the feedback data may include temporal displacement (TD) error data relating to the effectiveness of an autonomous vehicle action in achieving a next state (such as, getting lost would be a larger TD error, while being spot on to the next state or better, would be a smaller TD error).

Accordingly, a method and device for configuring an autonomous operation capability of a vehicle is disclosed. Configuring an autonomous decision-making by a vehicle may be based on a first dataset that relates to a plurality of vehicle in general (that is, including passenger vehicles, pickup trucks, suburban utility vehicles, recreational vehicles, etc.). Such a dataset may be referred to as stored passive environmental dynamic data that relates to passive data relating to a present vehicle state ($X_k$) and a next vehicle state ($X_{k+1}$). A second dataset may include a control dynamics model for a portion of the plurality of vehicles, such as that portion relating to the vehicle being configured for an autonomous capability. Detailed embodiments are disclosed herein. However, it is to be understood that the disclosed embodiments are intended only, as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

As one of ordinary skill in the art may appreciate, the term "substantially" or "approximately," as may be used herein, provides an industry-accepted tolerance to its corresponding term and/or relativity between items. Such relativity between items range from a difference of a few percent to magnitude differences.

As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled."

As the term "module" is used in the description of the drawings, a module includes a functional block that is implemented in hardware, software, and/or firmware that performs one or more functions such as the processing of an input signal to produce an output signal. As used herein, a module may contain submodules that themselves are modules.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method for configuring an autonomous operation capability of a vehicle, the method comprising:
    identifying, by at least one processor, a first dataset relating to a plurality of vehicles, wherein the vehicle is one of the plurality of vehicles and the first dataset is a passive environmental dynamic dataset including one of simulation data and data previously collected from one or more sensors of the vehicle and stored in a memory, the first dataset including present state data and next state data, the one or more sensors including at least one of an image sensor, a Light Detection and Ranging (LIDAR) sensor, and a radar sensor;
    producing, by the at least one processor, a state value function for the autonomous vehicle capability in relation to the first dataset, the state value function including a present state, a next state, and a state cost, the state cost relating to one or more performance characteristics of the vehicle;
    identifying, by the at least one processor, a second dataset relating to a portion of the plurality of vehicles, wherein the portion of the plurality of vehicles includes the vehicle and the second dataset is a control dynamics model stored in the memory, the second dataset including state cost data and control dynamics data; and
    optimizing, by the at least one processor, a policy control gain for the autonomous vehicle capability in relation to the second dataset;
    wherein the autonomous vehicle capability is operable to generate an autonomous vehicle action for progressing to a next state based on the state value function in cooperation with the policy control gain and the autonomous vehicle capability includes a reinforcement learning (RL) module including an actor-critic module to reduce active environmental scanning by the one or more sensors as the vehicle operates autonomously.

2. The method of claim 1, wherein the portion of the plurality of vehicles includes a vehicle class.

3. The method of claim 1, wherein the portion of the plurality of vehicles includes the vehicle.

4. The method of claim 1, wherein the actor-critic module includes:
    an actor module operable to generate a prediction of an action of the autonomous vehicle capability based on an adaptive policy generated from the first dataset and the second dataset; and
    a critic module operable to produce feedback data for the actor module relating to a reward parameter responsive to the first dataset and the second dataset, wherein the critic module, via the feedback data, further operates to modify a policy parameter of the actor module to form the adaptive policy.

5. The method of claim 4, wherein the feedback data includes temporal displacement error data.

6. A method for configuring an autonomous vehicle capability of a vehicle, the method comprising:
    identifying, by at least one processor, the vehicle with a plurality of vehicles;
    retrieving, by the at least one processor, a first dataset relating to a plurality of vehicles, wherein the first dataset is a passive environmental dynamic dataset including one of simulation data and data previously collected from one or more sensors of the vehicle and stored in a memory, the first dataset including present state data and next state data, the one or more sensors including at least one of an image sensor, a Light Detection and Ranging (LIDAR) sensor, and a radar sensor;
    producing, by the at least one processor, a state value function for the autonomous vehicle capability based on the first dataset, the state value function including a present state, a next state, and a state cost, the state cost relating to one or more performance characteristics of the vehicle;
    identifying, by the at least one processor, a second dataset relating to a portion of the plurality of vehicles wherein the portion of the plurality of vehicles includes the vehicle and the second dataset is a control dynamics model stored in the memory, the second dataset including state cost data and control dynamics data; and
    optimizing, by the at least one processor, a policy control gain for the autonomous vehicle capability in relation to the second dataset;
    wherein the autonomous vehicle capability is operable to generate an autonomous vehicle action for progressing to a next state based on the state value function in cooperation with the policy control gain and the autonomous vehicle capability includes a reinforcement learning (RL) module including an actor-critic module to reduce active environmental scanning by the one or more sensors as the vehicle operates autonomously.

7. The method of claim 6, wherein the portion of the plurality of vehicles includes a vehicle class.

8. The method of claim 6, wherein the portion of the plurality of vehicles includes a single make and model of a vehicle class.

9. The method of claim 6, wherein the control dynamics model includes a plurality of operational modes for the portion of the plurality of vehicles.

10. The method of claim 6, wherein the actor-critic module includes:
    an actor module operable to generate a prediction of an action of the autonomous vehicle capability based on an adaptive policy generated from the first dataset and the second dataset; and
    a critic module operable to produce feedback data for the actor module relating to a reward parameter responsive to the first dataset and the second dataset, wherein the critic module, via the feedback data, further operates to modify a policy parameter of the actor module to form the adaptive policy.

11. The method of claim 10, wherein the feedback data includes temporal displacement error data.

12. A vehicle control unit being configured for an autonomous vehicle capability for a vehicle, the vehicle control unit comprising:
    a wireless communication interface to service communication with a vehicle network;
    a processor communicably coupled to the wireless communication interface and to a plurality of vehicle sensor devices; and
    a memory communicably coupled to the processor and storing:
    a reinforcement learning module including instructions that, when executed by the processor, cause the processor to configure the reinforcement learning module for the autonomous vehicle capability by:
    accessing a passive environmental dynamic dataset relating to a plurality of vehicles, wherein the vehicle is one of the plurality of vehicles and the passive environmental dynamic dataset includes one of simulation data and data previously collected from one or more sensors of the vehicle, the passive environmental dynamic dataset including present state data and next state data, the one or more sensors including at least one of an image sensor, a Light Detection and Ranging (LIDAR) sensor, and a radar sensor;
    producing a state value function for the autonomous vehicle capability in relation to the passive environmental dynamic dataset, the state value function including a present state, a next state, and a state cost, the state cost relating to one or more performance characteristics of the vehicle;
    identifying a control dynamics model relating to a portion of the plurality of vehicles, wherein the portion of the plurality of vehicles includes the vehicle, the control dynamics model including state cost data and control dynamics data; and
    optimizing a policy control gain for the autonomous vehicle capability in relation to the second dataset; and
    wherein the autonomous vehicle capability is operable to generate an autonomous vehicle action for progressing to a next state based on the state value function in cooperation with the policy control gain and the autonomous vehicle capability includes a reinforcement learning (RL) module including an actor-critic module to reduce active environmental scanning by the one or more sensors as the vehicle operates autonomously.

13. The vehicle control unit of claim 12, wherein the actor-critic module includes instructions that, when executed by the processor, cause the processor to form the adaptive policy by:
    optimizing a vehicular policy to form the adaptive policy; and
    generating a prediction for the autonomous vehicle action based on the adaptive policy.

14. The vehicle control unit of claim 13, wherein the actor-critic module includes:
    an actor module including instructions that, when executed by the processor, cause the processor to generate the prediction for the autonomous vehicle action based on the adaptive policy; and
    a critic module including instructions that, when executed by the processor, cause the processor to produce feedback data for the actor module relating to a reward parameter responsive to the vehicular action, wherein the critic module, via the feedback data, further operates to modify a policy parameter of the actor module to form the adaptive policy.

15. The vehicle control unit of claim 14, wherein the feedback data includes temporal displacement error data.

16. The vehicle control unit of claim 12, wherein the portion of the plurality of vehicles includes a vehicle class.

* * * * *